US011468349B2

(12) United States Patent
Fan et al.

(10) Patent No.: US 11,468,349 B2
(45) Date of Patent: Oct. 11, 2022

(54) POI VALUATION METHOD, APPARATUS, DEVICE AND COMPUTER STORAGE MEDIUM

(71) Applicant: BEIJING BAIDU NETCOM SCIENCE AND TECHNOLOGY CO., LTD., Beijing (CN)

(72) Inventors: Miao Fan, Beijing (CN); Jizhou Huang, Beijing (CN); An Zhuo, Beijing (CN); Ying Li, Beijing (CN); Ping Li, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 338 days.

(21) Appl. No.: 16/936,190

(22) Filed: Jul. 22, 2020

(65) Prior Publication Data

US 2021/0034993 A1 Feb. 4, 2021

(30) Foreign Application Priority Data

Aug. 1, 2019 (CN) ........................ 201910706799.9

(51) Int. Cl.
*G06N 5/04* (2006.01)
*G06N 20/00* (2019.01)

(52) U.S. Cl.
CPC .............. *G06N 5/04* (2013.01); *G06N 20/00* (2019.01)

(58) Field of Classification Search
CPC ...... G06N 5/04; G06N 20/00; G06Q 30/0206; G06Q 30/0283; G06F 16/958; G06F 16/29; G06F 16/9537
See application file for complete search history.

(56) References Cited

U.S. PATENT DOCUMENTS 10,984,489 B1 * 4/2021 Bruce .................... G06N 20/00
11,093,982 B1 * 8/2021 Humphries ........ G06Q 30/0278
(Continued)

FOREIGN PATENT DOCUMENTS

CN 102254277 A 11/2011
CN 102933938 A 2/2013
(Continued)

OTHER PUBLICATIONS

Search Report in Chinese Application No. 201910706799.9, dated Aug. 1, 2019 with English translation provided by Google Translate.
(Continued)

*Primary Examiner* — El Hadji M Sall
(74) *Attorney, Agent, or Firm* — Ladas & Parry, LLP

(57) ABSTRACT

A POI valuation method, apparatus, device and computer storage medium are disclosed. The method comprises: obtaining information of first POIs with known values and information of second POIs with unknown values within a regional range; creating a valuation model which is configured to revaluate a first POI using values of surrounding POIs of the first POI, the surrounding POIs including other first POIs and second POIs within a predetermined range of distance from the first POI, and adjusting values of second POIs in the surrounding POIs using an error between a revaluated value of first POI and the known value of the first POI; training the valuation model until the error is minimized; obtaining the values of the second POIs from the valuation model. The solutions may reduce the requirement for manpower and improve the valuation efficiency as compared with manually valuation of POIs one by one.

20 Claims, 4 Drawing Sheets

(56) References Cited

U.S. PATENT DOCUMENTS

| | | | | |
|---|---|---|---|---|
| 2007/0185906 | A1* | 8/2007 | Humphries | G06Q 30/0278 |
| 2018/0038930 | A1* | 2/2018 | Kroell | G01R 33/543 |
| 2020/0118228 | A1* | 4/2020 | Harrington | G06Q 50/16 |

FOREIGN PATENT DOCUMENTS

| | | | |
|---|---|---|---|
| CN | 103823900 | A | 5/2014 |
| CN | 105243136 | A | 1/2016 |
| CN | 105321131 | A | 2/2016 |
| CN | 105608112 | A | 5/2016 |
| CN | 105956885 | A | 6/2016 |
| CN | 105956885 | A | 9/2016 |
| CN | 108572988 | A | 9/2018 |
| CN | 108985598 | A | 12/2018 |
| CN | 109190053 | A | 1/2019 |
| EP | 1422631 | A2 | 5/2004 |
| JP | 2016018237 | A | 2/2016 |

OTHER PUBLICATIONS

First Office Action in Chinese Application 201910706799.9, dated Feb. 13, 2020 with English translation provided by Google Translate.

Notification to Grant Patent Right for Invention from CN app. No. 201910706799.9, dated Sep. 25, 2020, with English translation from Global Dossier, all pages.

* cited by examiner

POI VALUATION METHOD, APPARATUS, DEVICE AND COMPUTER STORAGE MEDIUM

RELATED APPLICATIONS

The present application claims the priority of Chinese Patent Application No. 201910706799.9, filed on Aug. 1, 2019. The disclosure of the above application is incorporated herein by reference in its entirety.

TECHNICAL FIELD

The present disclosure relates to technical field of computer application, and particularly to a POI valuation method, apparatus, device and computer storage medium.

BACKGROUND

This portion aims to provide a background or context for embodiments of the present disclosure as stated in the claim set. The depictions here are not considered as the prior art as being included in this portion.

POI refers to Point of Interest, is a term in a geographic information system, and generally refers to all geographical objects that may be abstracted as points. A POI may be a house, a shop, a mail box, a bus stop, a school, a hospital etc. A main function of the POI is to describe the position of a thing or event to enhance a capability of describing and a capability of querying for the position of the thing or event.

In an Internet map-like application, the POI plays a very important role. The collection of POI information is a very time-consuming and arduous task, e.g., a cartographer needs to carry a precise mapping instrument to obtain latitude and longitude of a point of interest, and then mark them. Hence, the number and quality of the POIs represent a value of the entire Internet map-like application to a certain degree.

As the functions of map-like applications are constantly enriched and users' demands increase constantly, it is desirable to perform objective evaluation and presentation of the value of each POI. The valuation of the POI requires a valuation professional to give a valuation result with reference to factors in many aspects. On the one hand, there are higher requirements for the knowledge background of valuators, and on the other hand, it is time-consuming and arduous for the valuators to valuate massive POIs in the map-like application, and even it is impossible to complete the valuation.

SUMMARY

In view of the above, the present disclosure provides a POI valuation method, apparatus, device and computer storage medium, to reduce the requirement for manpower and improve the evaluation efficiency.

Specific technical solutions are as follows:

In an aspect, a POI valuation method is proposed, and the method includes:

obtaining information of first POIs with known values and information of second POIs with unknown values within a regional range;

creating a valuation model; wherein the valuation model is configured for revaluating a first POI using values of surrounding POIs of the first POI, the surrounding POIs including other first POIs and second POIs within a predetermined range of distance from the first POI, and for adjusting values of the second POIs in the surrounding POIs using an error between a revaluated value of the first POI and a known value of the first POI;

training the valuation model until the error is minimized; and obtaining the values of the second POIs from the valuation model.

According to an embodiment of the present disclosure, the valuation model is a multiple regression model which is trained using a gradient descent algorithm.

According to an embodiment of the present disclosure, training the valuation model includes:

initializing the values of second POIs;

revaluating the first POI using values of surrounding POIs of the first POI; and adjusting the values of the second POIs in the surrounding POIs using the error between the revaluated value of the first POI and the known value of the first POI, turning back to revaluate the first POI using the values of surrounding POIs of the first POI, until the error meets a preset requirement.

According to an embodiment of the present disclosure, revaluating the first POI using the values of surrounding POIs of the first POI includes:

revaluating the first POIs using the values of the surrounding POIs of the first POI, a value influence function of the surrounding POIs on the first POI, attribute features of the first POI and a value influence function of respective attribute features on the first POI;

during training of the valuation model, adjusting parameter values in the value influence function of the surrounding POIs on the first POI, parameter values in the value influence function of the attribute features on the first POI, and the values of the second POIs.

According to an embodiment of the present disclosure, the value influence function of the surrounding POIs on the first POI depends on respective distances between the surrounding POIs and the first POI.

According to an embodiment of the present disclosure, the valuation model is trained in a MapReduce manner.

According to an embodiment of the present disclosure, training the valuation model in a MapReduce manner includes:

assigning respective instances to a plurality of computing nodes which perform the revaluation and determination of the error, respectively, wherein each instance includes information of the first POI and information of surrounding POIs of the first POI; and collecting and integrating model parameters and adjusted values of the second POIs determined by the computing nodes with respect to respective instances, and re-determining corresponding adjusted values with respect to the model parameters and values of the second POIs, respectively.

According to an embodiment of the present disclosure, the method may further include:

storing the values of the second POIs obtained from the valuation model in a database.

According to an embodiment of the present disclosure, the method may include:

in response to receiving a query request for the second POIs, querying the database and returning value information of the second POIs as queried.

According to an embodiment of the present disclosure, the first POIs are private properties POIs, and the second POIs are public facilities POIs.

In another aspect, a POI valuation apparatus is proposed, and the apparatus includes:

an obtaining unit configured to obtain information of first POIs with known values and information of second POIs with unknown values within a regional range;

a creating unit configured to create a valuation model; wherein the valuation model is configured to revaluate a first POI using values of surrounding POIs of the first POI, the surrounding POIs including other first POIs and second POIs within a predetermined range of distance from the first POI, and adjust the values of the second POIs in the surrounding POIs using an error between the revaluated values of the first POI and a known value of the first POI;

a training unit configured to train the valuation model until the error is minimized; and an outputting unit configured to obtain the values of the second POIs from the valuation model.

According to an embodiment of the present disclosure, the valuation model is a multiple regression model which is trained using a gradient descent algorithm.

According to an embodiment of the present disclosure, the valuation model revaluates the first POIs using the values of the surrounding POIs of the first POI, a value influence function of the surrounding POIs on the first POI, attribute features of the first POI and a value influence function of respective attribute features on the first POI;

during training of the valuation model, the training unit adjusts parameter values in the value influence function of the surrounding POIs on the first POI, parameter values in the value influence function of the attribute features on the first POI, and the values of the second POIs.

According to an embodiment of the present disclosure, the value influence function of the surrounding POIs on the first POI depends on respective distances between the surrounding POIs and the first POI.

According to an embodiment of the present disclosure, the training unit trains the valuation model in a MapReduce manner, including:

assigning respective instances to a plurality of computing nodes which perform the revaluation and determination of the error, respectively, wherein each instance includes information of the first POI and information of surrounding POIs of the first POI; and collecting and integrating model parameters and adjusted values of the second POIs determined by the computing nodes with respect to respective instances, and re-determining corresponding adjusted values with respect to the model parameters and values of the second POIs, respectively.

According to an embodiment of the present disclosure, the apparatus further includes:

a storing unit configured to store the values of the second POIs obtained from the valuation model in a database.

According to an embodiment of the present disclosure, the apparatus further includes:

a querying unit configured to, in response to receiving a query request for the second POIs, query the database and return value information of the second POIs as queried.

According to an embodiment of the present disclosure, the first POIs are private properties POIs, and the second POIs are public facilities POIs.

In another aspect, a device is proposed which includes:

one or more processors;

a storage for storing one or more programs, the one or more programs, when executed by said one or more processors, enable said one or more processors to implement any of the method described above.

In another aspect, it is proposed a storage medium containing computer executable instructions which, when executed by a computer processor, perform any of the method described above.

As may be seen from the above technical solutions, during the training of the valuation model in the present disclosure, the value of a first POI with known value is revaluated using values of surrounding second POIs with unknown values, and the values of second POIs are adjusted using an error between a revaluated value of the first POI and the known value of the first POI, and the process is performed iteratively to obtain the values of the second POIs. This technical solution may substantially reduce the requirement for manpower and improve the valuation efficiency as compared with manually valuation of POIs one by one.

DETAILED DESCRIPTION

The present disclosure will be described in detail with reference to figures and specific embodiments to make objectives, technical solutions and advantages of the present disclosure more apparent.

Figure 1:
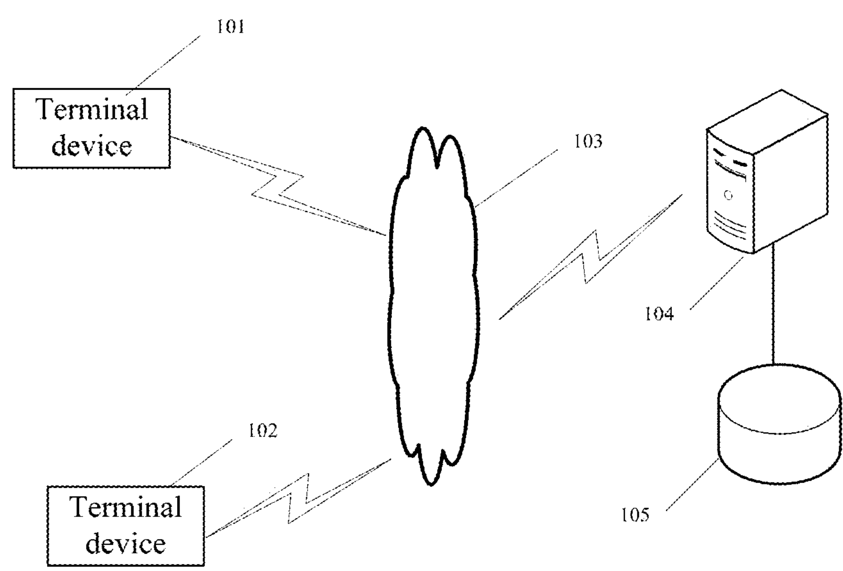
FIG. 1 is an example system architecture to which a method or apparatus according to embodiments of the present disclosure may be applied.

FIG. 1 is an example system architecture to which a method or apparatus according to embodiments of the present disclosure may be applied. As shown in FIG. 1, the system architecture may include terminal devices 101 and 102, a network 103 and a server 104. The network 103 is used to provide a medium for a communication link between the terminal devices 101, 102 and the server 104. The network 103 may include various connection types, e.g., a wired or wireless communication link or an optical fiber cable.

The user may interact with the server 104 via the network 103 using the terminal devices 101 and 102. Various applications may be installed on the terminal devices 101 and 102, for example map-like applications, web browser applications, communication-like applications, and so on.

The terminal devices 101 and 102 may be various user devices capable of running map-like applications, and include but not limited to smart phones, tablet computers, PCs, smart TV sets, etc. The POI valuation apparatus provided by the present disclosure may be disposed on and run on the above server 104. It may be implemented as a plurality of software or software modules (for example, to provide distributed service) or as a single software or software module, which is not specifically limited herein. The server 104 may interact with the database 105. Specifically, the server 104 may obtain data from the database 105 or store data into the database 105.

For example, the POI valuation apparatus is disposed on and runs on the server 104. The server 104 performs POI valuation using the method according to embodiments of the present disclosure, and then stores data related to the obtained POI value into the database 105. The server 104 may, in response to receiving a query request of the terminal devices 101, 102, query the database 105 and return found POI value information to the terminal devices 101, 102. Alternatively, the server 104 may export the POI value-related data stored in the database 105 to specific terminal devices 101, 102. Specific application scenarios will be described in detail in subsequent embodiments.

The server 104 may be a single server or a server group composed of a plurality of servers. In addition to taking the form of a server, 104 may also be other computer systems or processors having a high computing performance. It should be understood that the number of terminal devices, network, server and database in FIG. 1 is only illustrative. According to the needs in implementation, there may be any number of terminal devices, networks, servers and databases.

In POIs collected in the map-like application, some POIs with known values usually already exist, and these POI values may be decided by the market or determined by some authorities, etc. A core idea of the present disclosure lies in creating a model using mutual influence based on a positional relationship between POIs with known values and POIs with unknown values, thereby valuating the POIs with unknown values. The present disclosure will be described in detail with reference to embodiments.

Figure 2:
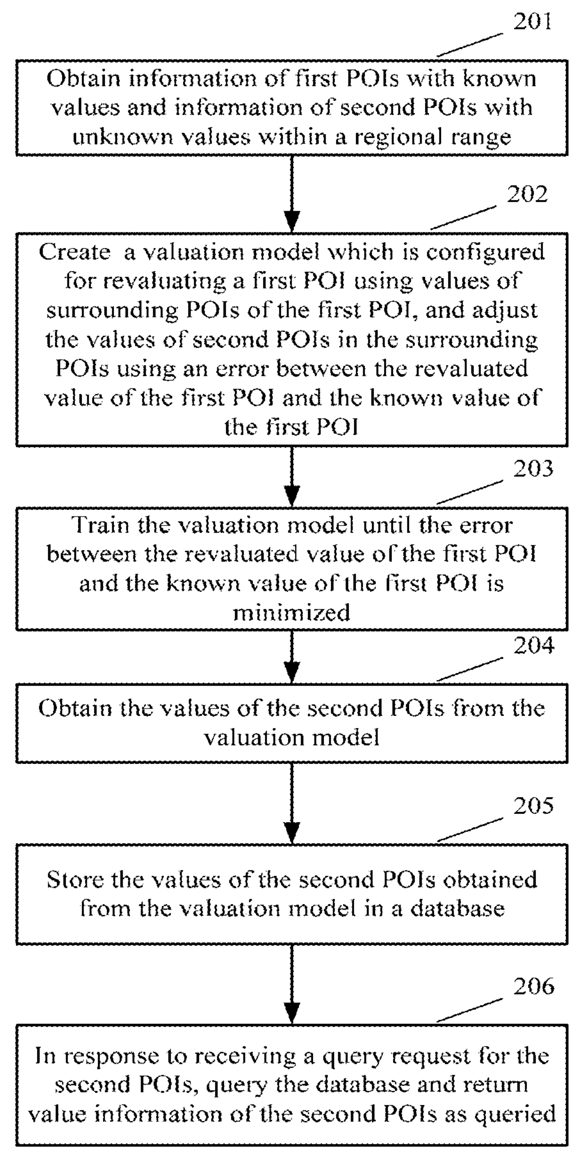
FIG. 2 is a flow chart of a main method according to an embodiment of the present disclosure.

FIG. 2 is a flow chart of a main method according to an embodiment of the present disclosure. The method may be performed by a computer system or processor. As shown in FIG. 2, the method may include the following steps:

At 201, obtain information of first POIs with known values and information of second POIs with unknown values within a regional range.

In embodiments of the present disclosure, the POIs with known values are referred to as first POIs, and POIs with unknown values are referred to as second POIs. It needs to be appreciated that “first” and “second” involved in embodiments of the present disclosure are only intended to distinguish the POIs with known values from POIs with unknown values, and not to limit in sense of order, number and so on.

“A regional range” involved in this step refers to a range involved by current POI valuation of this time, e.g., when POI valuation is performed for a city, the regional range refers to a geographic region covered by the city. Likewise, the regional range may be other administrative regional ranges such as a country, a province, a district and so on. In addition, the regional range may further be any designated geographic region, e.g., a range of a geographical region bounded by specific longitude and latitude.

This step is not limited to the manner of obtaining the information of first POIs with known values and information of second POIs with unknown values. The values of the first POIs may be values decided by the market, values determined by some authorities, or values determined in other manners.

As an exemplary implementation, the above first POIs may be private properties POIs, and the second POIs may be public facilities POIs. As well known, values of private properties POIs are usually reflected by house price and usually decided by the market. The values of public facilities POIs are usually difficult to be estimated/valueated/evaluated/assessed. In the embodiments of the present disclosure, known house price may be used to valuate/assess the public facilities POIs.

The public facilities POIs involved in the present disclosure refer to various public and serving facilities providing common service products to the public. For example, the public facilities POIs include POIs of educational facilities such as schools, kindergartens, training services and so on, POIs of medical care and health-like facilities such as hospitals, clinics, health recovery institutions and so on, POIs of transport-like facilities such as airports, railway stations, bus stops and so on, POIs of sports-like facilities such as stadiums, natatoriums and gyms and so on, POIs of business and financial-like facilities such as shopping malls, cinemas, banks and so on, and POIs of social welfare and security-like facilities such as communication service centers, power supply bureaus and so on.

At 202, a valuation model is created. The valuation model is configured for revaluating a first POI using values of surrounding POIs of the first POI, and adjusting the values of second POIs in the surrounding POIs using an error between a revaluated value of first POI and the known value of the first POI. The term “valuate” here means estimate the value/price/worth of something, and “revaluate” means re-estimate the value/price/worth of something.

When the valuation model is created, for the values of the first POI, value influence applied by the surrounding POIs on the first POI is considered on the one hand, the surrounding POIs include other first POIs and second POIs within a predetermined range of distance from the first POIs; and value influence applied by first POI' own attributes on the first POI is considered on the other hand. A multiple regression model may be created based on considerations in the two aspects, to revaluate the first POI using the values of the surrounding POIs of the first POI, a value influence function of the surrounding POIs on the first POI, attribute features of the first POI and a value influence function of respective attribute features on the first POI. During subsequent training of the valuation model, adjustment is made to parameter values in the value influence function of the surrounding POIs on the first POI, parameter values in the value influence function of attribute features on the first POI, and the values of the second POIs.

Specifically, assuming that values of all POIs within a l-km radius range around the first POI are represented as a vector w, wherein $w \in R^k$, where R represents a real number, k represents a dimension of the vector w, and l is a preset positive integer. Since the surrounding of the first POI might include other first POIs in addition to the second POIs, w may be represented as a splicing of vectors v and u:

$$w = u \oplus v \quad (1)$$

where the vector v represents a value vector of other first POIs surrounding the first POI, and the vector u represents a value vector of the second POIs surrounding the first POI.

Figure 3A:
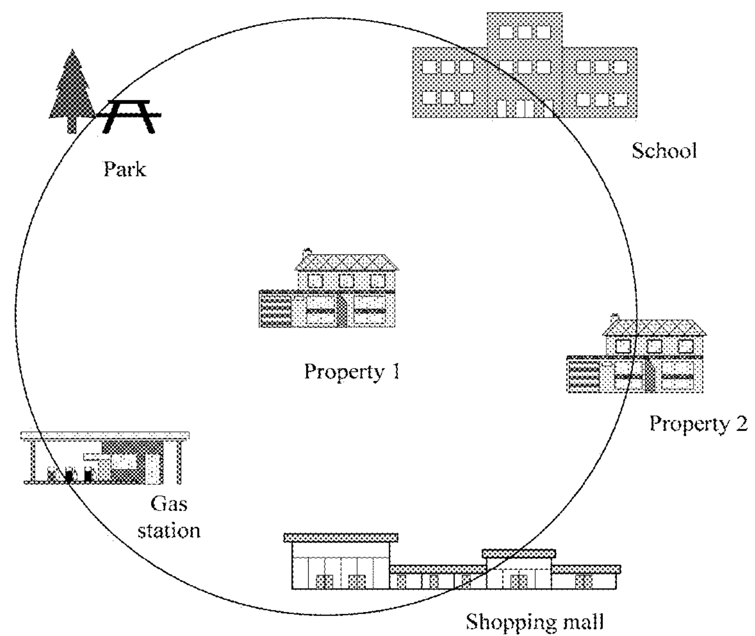
FIG. 3*a* and FIG. 3*b* are diagrams of examples of POI distribution according to embodiments of present disclosure.

As shown in FIG. 3*a*, as for the private property 1 with a known value, the a 3-km radius range around it include public facilities POIs with unknown values such as a school, a park, a gas station, a shopping mall etc. and further include private property 2 with a known value. Hence, the value vector w of the POIs surrounding the property 1 is constituted as a splicing of the value vector u of the above public facilities POIs and the value vector v of private property 2.

The values of the surrounding POIs will influence/affect the values of the first POI at the center to a different degree. Such a value influence degree usually depends on a distance in a geographic space. Assuming a value influence function with the space distance as a variable is defined and used to measure the influence applied by each surrounding POI on the values of the first POI at the center, the value influence function $F(D;\phi)$ may be represented as:

$$F(D;\phi)=\text{softmax}(D;\phi)=\frac{\exp(\phi^T D)}{\Sigma_k(\phi^T D)} \tag{2}$$

where soft max( ) is an indexed normalization function, $\phi$ is a model parameter, $D\in R^{t\times k}$, D represents t types of distances from surrounding k POIs to the first POI at the center, and the distances may include but not limited to: spatial linear distance, street block, walking distance, driving distance and riding distance.

For the first POI, its attribute features are represented as vector x, where the attribute feature vector may include but not limited to: building age, building type, property type, developer, property management company etc. These attributes have a certain discounting effect on the value of the first POI. This discounting effect is the value influence function $S(x;\Theta)$ of its attribute features on the value of the first POI, and may be represented as:

$$S(x;\Theta)=\text{sigmoid}(x;\theta)=\frac{1}{1+\exp(-\theta^T x)} \tag{3}$$

where sigmoid( ) is a S-type function, and $\theta$ is a model parameter.

After considerations in the two aspects are combined, the value h of the first POI obtained by revaluation of the first POI may be represented by the following equation:

$$\hat{h}=S(x;\Theta)\times((u\oplus v)\cdot F(D;\phi)) \tag{4}$$

At 203, the valuation model is trained until the error between a revaluated value of the first POI and the known value of the first POI is minimized.

For the created valuation model, it may be seen from the above Equation (4) that the model parameters $\phi$ and $\theta$ and the vector u are variables that need to be learnt and updated during model training. In other words, during model training, the model parameters $\phi$ and $\theta$ and the vector u are iteratively adjusted so that the error between the revaluated value of the first POI and known value of the first POI is minimized:

$$\text{Loss}=\text{minimize}\left(\sum_{i=1}^{n}\left(h^{(i)}-\hat{h}^{(i)}\right)^2\right) \tag{5}$$

Where i refers to $i^{th}$ instance and is a serial number of the instance, and n is a total number of instances. Regarding the information obtained from step 201, the information of each first POI and the information of the surrounding POIs of the first POI may be used to form an instance. Upon model training, each instance may be used as a training sample for training.

$\hat{h}^{(i)}$ is the revaluated value of the first POI information of the $i^{th}$ instance, it may be determined using Equation (4), and $h^{(i)}$ is the known value of the first POI information of the $i^{th}$ instance.

The specific training process may perform the following processing with respect to each instance:

S1: initializing values of respective second POIs.

S2: revaluating the first POI using values of surrounding POIs of the first POI.

S3: adjusting the values of second POIs in the surrounding POIs using the error between the revaluated value of first POI and the known value of the first POI, turning back to S2 until the error meets a preset requirement, e.g., the error is smaller than a preset threshold.

The values of the second POIs in surrounding POIs may also be adjusted as parameters in the multiple regression model. In addition, what are adjusted together further include the above model parameters $\phi$, $\theta$.

During model training, a gradient descent algorithm may be used for training. Since the gradient descent algorithm is a relatively mature existing algorithm, it will not be detailed here.

In some cases, the number of instances within a regional range is very large, which requires very strong computing resources and consumes a long period of time. To solve this problem, a MapReduce manner may be employed to train the valuation model in embodiments of the present disclosure.

Specifically, respective instances may be assigned to a plurality of computing nodes (referred to as Map task nodes) which perform the revaluation and determination of the error, respectively, and determine the model parameters and adjusted values of the second POIs with respect to respective instances. Then, one computing node (referred to as a Reduce task node) collects the model parameters and adjusted values of the second POIs determined by the computing nodes with respect to respective instances, and re-determines corresponding adjusted values with respect to the model parameters and values of the second POIs.

Figure 3B:
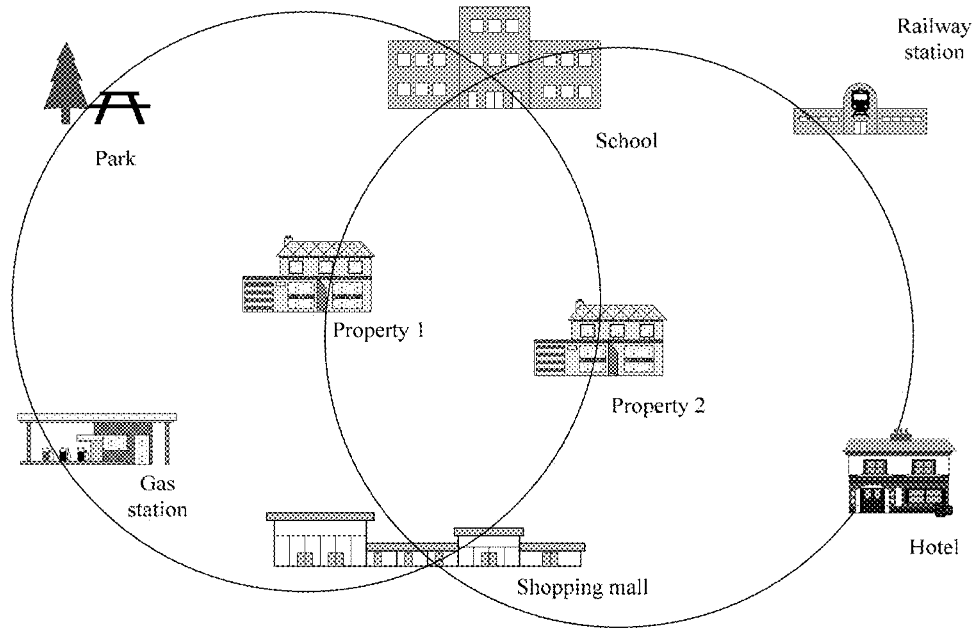

The reason why one Reduce task node is needed to re-determine the adjusted values is that there might exist the following problem: while a second POI serves as a surrounding POI of a first POI, it might also be a surrounding POI of another first POI. In other words, one second POI might exist in a plurality of instances. As shown in FIG. 3*b*, the school appears in the instance with the private property 1 as the center as well as the instance with the private property 2 as the center. Then, the adjusted values of the second POI determined with respect to the plurality of instances might be different, and integration processing needs to be performed.

Specifically, the Reduce task node may sum the adjusted values of the same model parameter to obtain the adjusted value of the model parameter, and sum the adjusted values of the same second POI to obtain the adjusted value of the second POI. Then, the adjusted value of the model parameter and the adjusted value of the second POI determined by the Reduce task node are used to adjust the corresponding model parameter and the value of the second POI, and then the respective Map task nodes perform the revaluation and error determination. This is performed repeatedly and iteratively until the error meets a preset requirement and a corresponding value of second POI is output.

At 204, the values of the second POIs are obtained from the valuation model.

By constantly adjusting the model parameters and values of the second POIs, the valuation model gradually tends to converge. In other words, the value of the error of the instances meets the preset requirement, and the values of the second POIs in the valuation model are output.

At 205, the values of the second POIs obtained from the valuation model are stored in a database.

In embodiments of the present disclosure, values of the second POIs in a regional range may be determined in the above manner, and then stored in the database. Since the values of the first POIs are known, they may be directly stored in the database. Such a database has data of the values of POIs within the regional range.

The data of these POIs in the database may be partly or entirely exported and provided to a specific user. For example, if the values of public facilities POIs are evaluated in the above manner through house price evaluation of the city, the values of public facilities POIs of the city may be provided to government agencies as an economic reference for the government agencies to build public facilities POIs. For another example, the values may be provided to business clients and regarded by the business clients as an investment reference in selecting addresses of the POIs and POI types.

At 206, in response to receiving a query request for the second POIs, the database is queried and value information of the second POIs found is returned.

In some scenarios, the server may receive the query request from the terminal device, and the query request includes information of the second POIs to be queried. The scenarios may include but not limited to the following scenarios:

Scenario 1: a user hopes to query for the value of a certain specific second POI, the ID information or name of position information of the second POI is included in the query request; in response to receiving the query request, the server queries the database for the value information corresponding to the second POI and returns the value information to the terminal device. The terminal device may display the value information of the second POI on an interface of the map-like application.

Scenario 2: a user hopes to query for the value of a second POI within a certain regional range, the information of the regional range is included in the query request; in response to receiving the query request, the server uses the information of the regional range to determine the information of the second POI within the regional range, e.g., the ID information, name or position information of the second POI, queries the database and returns the corresponding value information of the second POI to the terminal device. The terminal device may display the value information of the second POI within the regional range on the interface of the map-like application.

Scenario 3: a user hopes to query for the value of a certain type of second POI, the information of the type is included in the query request; in response to receiving the query request, the server queries the database and returns value information of all second POIs in this type to the terminal device. The terminal device may display the value information of all second POIs in this type on the interface of the map-like application.

The above query takes the value of the second POI as an example. In practice, if values of the first POIs are stored in the database, the query for the values of the first POIs may also be implemented.

Figure 4:
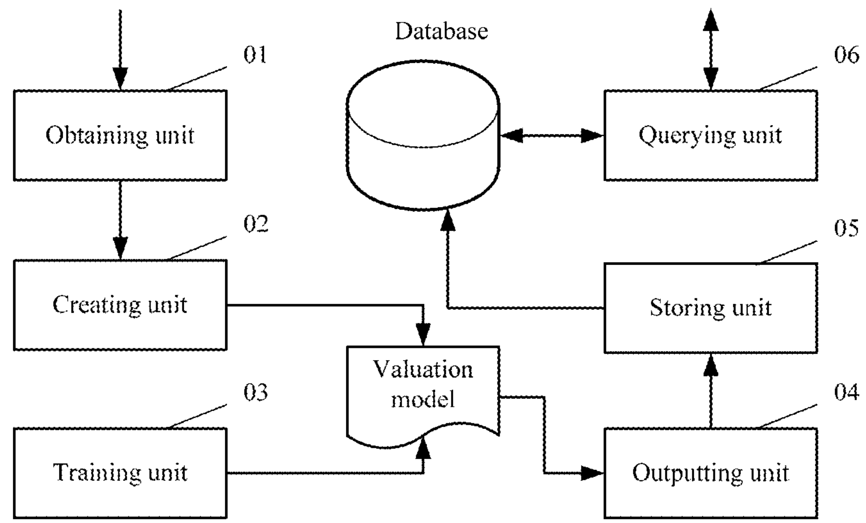
FIG. 4 is a structural schematic diagram of a POI valuation apparatus according to an embodiment of the present disclosure.

FIG. 4 is a structural schematic diagram of a POI valuation apparatus according to an embodiment of the present disclosure. As shown in FIG. 4, the apparatus may include: an obtaining unit 01, a creating unit 02, a training unit 03 and an output unit 04, and may further comprise a storing unit 05 and a querying unit 06. Main functions of the above units are as follows:

The obtaining unit 01 is configured to obtain information of first POIs with known values and information of second POIs with unknown values within a regional range.

The creating unit 02 is configured to create a valuation model; the valuation model is configured to revaluate a first POI using values of surrounding POIs of the first POI, the surrounding POIs including other first POIs and second POIs within a predetermined range of distance from the first POI, and adjust the values of the second POIs in the surrounding POIs using an error between the revaluated value of the first POI and the known value of the first POI.

The training unit 03 is configured to train the valuation model until the error is minimized.

The valuation model built by the creating unit 02 may be a multiple regression model, wherein the values of the second POIs serve as parameters to be iteratively adjusted in the multiple regression model. The training unit 03 may employ a gradient descent algorithm for training.

The valuation model revaluates the first POI using the values of the surrounding POIs of the first POI, a value influence function of the surrounding POIs on the first POI (the value influence function of the surrounding POIs on the first POI depends on a distance between the surrounding POIs and the first POI, and may employ the Equation (2) in the method embodiment), attribute features of the first POI and a value influence function of respective attribute features on the first POI (the function may employ the Equation (3) in the method embodiment). The specific revaluating manner may employ the Equation (4) in the method embodiment.

During training of the valuation model, the training unit 03 adjusts parameter values in the value influence function of the surrounding POIs on the first POI, parameter values in the value influence function of attribute features on the first POI, and the values of the second POIs.

To improve the efficiency in training the model, preferably the training unit 03 may train the valuation model in a MapReduce manner, and specifically perform the following:

Respective instances may be assigned to a plurality of computing nodes (referred to as Map task nodes) which perform the revaluation and determination of the error, respectively, wherein each instance includes information of the first POI and information of surrounding POIs of the first POI; a (one) computing node (referred to as a Reduce task node) collects and integrates the model parameters and adjusted values of the second POIs determined by the computing nodes with respect to respective instances, and re-determines corresponding adjusted values with respect to the model parameters and values of the second POIs, respectively.

Specifically, the Reduce task node may sum the adjusted values of the same model parameter to obtain the adjusted value of the model parameter, and sum the adjusted values of the same second POI to obtain the adjusted value of the second POI. Then, the adjusted value of the model parameter and the adjusted value of the second POI determined by the Reduce task node are used to adjust the corresponding model parameter and the value of the second POI, and then the respective Map task nodes perform the revaluation and error determination. This is performed repeatedly and iteratively until the error meets a preset requirement and a corresponding value of second POI is output.

The outputting unit 04 is configured to obtain the values of the second POIs from the valuation model.

The storing unit 05 is configured to store the values of the second POIs obtained from the valuation model in a database, and meanwhile store the values of the first POIs with known values in the database.

The querying unit 06 is configured to, in response to receiving a query request for the second POIs, query the database and return value information of the second POIs as queried.

As a preferred implementation, the above first POIs are private properties POIs, and the second POIs are public facilities POIs.

Figure 5:
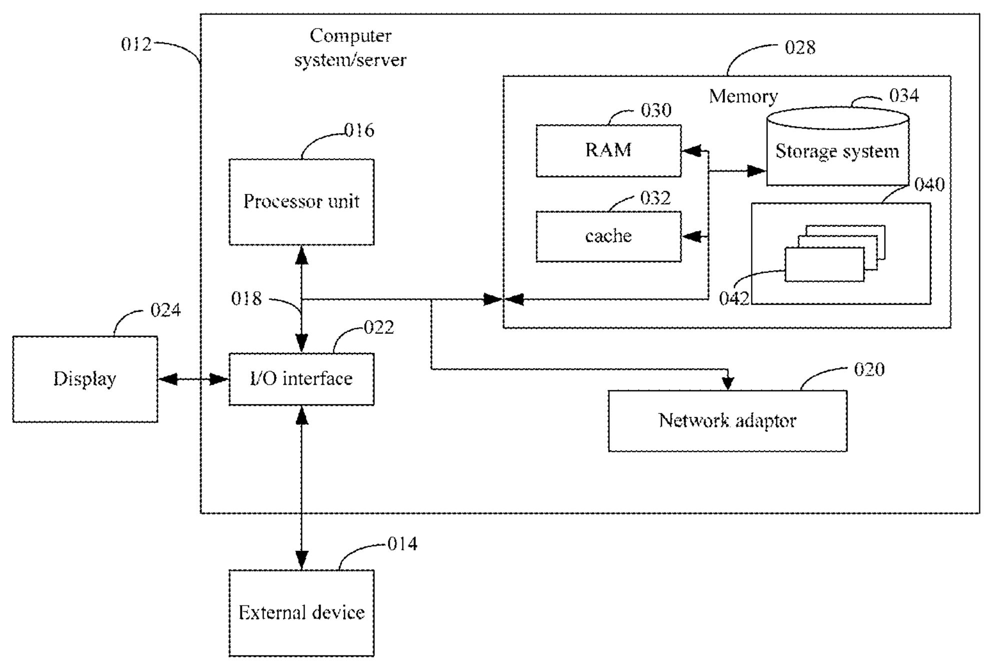
FIG. 5 is a block diagram of an exemplary computer system/server adapted to implement embodiments of the present disclosure.

FIG. 5 illustrates a block diagram of an example computer system/server 012 adapted to implement an implementation mode of the present disclosure. The computer system/server 012 shown in FIG. 5 is only an example and should not bring about any limitation to the function and scope of use of the embodiments of the present disclosure.

As shown in FIG. 5, the computer system/server 012 is shown in the form of a general-purpose computing device. The components of the computer system/server 012 may include, but are not limited to, one or more processors or processing units 016, a system memory 028, and a bus 018 that couples various system components including system memory 028 and the processing unit 016.

The bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by the computer system/server 012, and it includes both volatile and non-volatile media, removable and non-removable media.

The system memory 028 may include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 may be provided for reading from and writing to a non-removable, non-volatile magnetic media (not shown in FIG. 5 and typically called a "hard drive"). Although not shown in FIG. 5, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each drive may be connected to bus 018 by one or more data media interfaces. The memory 028 may include at least one program product having a set (e.g., at least one) of program modules that are configured to carry out the functions of embodiments of the present disclosure.

Program/utility 040, having a set of (at least one) program modules 042, may be stored in the system memory 028 by way of example, and not limitation, as well as an operating system, one or more application programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc. In the present disclosure, the computer system/server 012 may communicate with an external radar device, with one or more devices that enable a user to interact with computer system/server 012; and/or with any devices (e.g., network card, modem, etc.) that enable computer system/server 012 to communicate with one or more other computing devices. Such communication may occur via Input/Output (I/O) interfaces 022. Still yet, computer system/server 012 may communicate with one or more networks such as a local area network (LAN), a general wide area network (WAN), and/or a public network (e.g., the Internet) via a network adapter 020. As depicted in FIG. 5, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes various function applications and data processing by running programs stored in the system memory 028, for example, implement the steps of the method according to embodiments of the present disclosure.

The aforesaid computer program may be arranged in the computer storage medium, namely, the computer storage medium is encoded with the computer program. The computer program, when executed by one or more computers, enables one or more computers to execute the flow of the method and/or operations of the apparatus as shown in the above embodiments of the present disclosure. For example, the one or more processors perform the steps of the method according to embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium may be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

As may be seen from the above depictions, the method, apparatus, device and computer storage medium according to embodiments of the present disclosure may have the following advantages:

1) during the training of the valuation model in the present disclosure, the value of a first POI with a known value is revaluated using values of surrounding second POIs with unknown values, and the values of second POIs are adjusted using an error between the revaluated value of first POI and the known value of the first POI, and the process is performed iteratively to obtain the values of the second POIs. This manner substantially reduces the requirement for manpower and improves the evaluating efficiency as compared with the manner of manually evaluating the values of POIs one by one.

2) According to the present disclosure, it is possible to use the POIs such as private properties POIs whose values are decided by the market, to analyze to obtain the values of the public facilities POIs, thereby remedying the technical drawback in the prior art that the values of public facilities POIs cannot be evaluated reasonably.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A Point of Interest (POI) valuation method, the method comprising:

obtaining information of first POIs with known values and information of second POIs with unknown values within a regional range;

creating a valuation model; wherein the valuation model is configured for revaluating a first POI using values of surrounding POIs of the first POI, the surrounding POIs including other first POIs and second POIs within a predetermined range of distance from the first POI, and for adjusting values of the second POIs in the surrounding POIs using an error between a revaluated value of the first POI and the known value of the first POI;

training the valuation model until the error is minimized; and obtaining the values of the second POIs from the valuation model.

2. The method according to claim 1, wherein the valuation model is a multiple regression model which is trained using a gradient descent algorithm.

3. The method according to claim 1, wherein training the valuation model comprises:

initializing the values of second POIs;

revaluating the first POI using values of surrounding POIs of the first POI; and adjusting the values of the second POIs in the surrounding POIs using the error between the revaluated value of the first POI and the known value of the first POI, turning back to revaluate the first POI using the values of surrounding POIs of the first POI, until the error meets a preset requirement.

4. The method according to claim 1, wherein revaluating the first POI using the values of surrounding POIs of the first POI comprises:

revaluating the first POIs using the values of the surrounding POIs of the first POI, a value influence function of the surrounding POIs on the first POI, attribute features of the first POI and a value influence function of respective attribute features on the first POI; and during training of the valuation model, adjusting parameter values in the value influence function of the surrounding POIs on the first POI, parameter values in the value influence function of the attribute features on the first POI, and the values of the second POIs.

5. The method according to claim 4, wherein the value influence function of the surrounding POIs on the first POI depends on respective distances between the surrounding POIs and the first POI.

6. The method according to claim 1, wherein the valuation model is trained in a MapReduce manner.

7. The method according to claim 6, wherein training the valuation model in a MapReduce manner comprises:

assigning respective instances to a plurality of computing nodes which perform the revaluation and determination of the error, respectively, wherein each instance includes information of the first POI and information of surrounding POIs of the first POI; and collecting and integrating model parameters and adjusted values of the second POIs determined by the computing nodes with respect to respective instances, and redetermining corresponding adjusted values with respect to the model parameters and values of the second POIs, respectively.

8. The method according to claim 1, further comprising:

storing the values of the second POIs obtained from the valuation model in a database.

9. The method according to claim 8, further comprising:

in response to receiving a query request for the second POIs, querying the database and returning value information of the second POIs as queried.

10. The method according to claim 1, wherein the first POIs are private properties POIs, and the second POIs are public facilities POIs.

11. A device, wherein the device comprises:

one or more processors;

a storage for storing one or more programs, the one or more programs, when executed by said one or more processors, enable said one or more processors to implement a Point of Interest (POI) valuation method, the method comprising:

obtaining information of first POIs with known values and information of second POIs with unknown values within a regional range;

creating a valuation model; wherein the valuation model is configured for revaluating a first POI using values of surrounding POIs of the first POI, the surrounding POIs including other first POIs and second POIs within a predetermined range of distance from the first POI, and for adjusting values of the second POIs in the surrounding POIs using an error between a revaluated value of the first POI and the known value of the first POI;

training the valuation model until the error is minimized; and obtaining the values of the second POIs from the valuation model.

12. The device according to claim 11, wherein the valuation model is a multiple regression model which is trained using a gradient descent algorithm, and the training comprises:

initializing the values of second POIs;

revaluating the first POI using values of surrounding POIs of the first POI; and adjusting the values of the second POIs in the surrounding POIs using the error between the revaluated value of the first POI and the known value of the first POI, turning back to revaluate the first POI using the values of surrounding POIs of the first POI, until the error meets a preset requirement.

13. The device according to claim 11, wherein revaluating the first POI using the values of surrounding POIs of the first POI comprises:

revaluating the first POIs using the values of the surrounding POIs of the first POI, a value influence function of the surrounding POIs on the first POI, attribute features of the first POI and a value influence function of respective attribute features on the first POI; and during training of the valuation model, adjusting parameter values in the value influence function of the surrounding POIs on the first POI, parameter values in the value influence function of the attribute features on the first POI, and the values of the second POIs.

14. The device according to claim 13, wherein the value influence function of the surrounding POIs on the first POI depends on respective distances between the surrounding POIs and the first POI.

15. The device according to claim 11, wherein the valuation model is trained in a MapReduce manner, and the training comprises:

assigning respective instances to a plurality of computing nodes which perform the revaluation and determination of the error, respectively, wherein each instance includes information of the first POI and information of surrounding POIs of the first POI; and collecting and integrating model parameters and adjusted values of the second POIs determined by the computing nodes with respect to respective instances, and redetermining corresponding adjusted values with respect to the model parameters and values of the second POIs, respectively.

16. The device according to claim 11, wherein the method further comprises:

storing the values of the second POIs obtained from the valuation model in a database.

17. The device according to claim 16, wherein the method further comprises:

in response to receiving a query request for the second POIs, querying the database and returning value information of the second POIs as queried.

18. The device according to claim 11, wherein the first POIs are private properties POIs, and the second POIs are public facilities POIs.

19. A non-transitory computer-readable storage medium containing computer executable instructions which, when executed by a computer processor, perform a Point of Interest, POI, valuation method, the method comprising:

obtaining information of first POIs with known values and information of second POIs with unknown values within a regional range;

creating a valuation model; wherein the valuation model is configured for revaluating a first POI using values of surrounding POIs of the first POI, the surrounding POIs including other first POIs and second POIs within a predetermined range of distance from the first POI, and for adjusting values of the second POIs in the surrounding POIs using an error between a revaluated value of the first POI and the known value of the first POI;

training the valuation model until the error is minimized; and obtaining the values of the second POIs from the valuation model.

20. The non-transitory computer-readable storage medium according to claim 19, wherein the valuation model is a multiple regression model which is trained using a gradient descent algorithm, and the training comprises:

initializing the values of second POIs;

revaluating the first POI using values of surrounding POIs of the first POI; and adjusting the values of the second POIs in the surrounding POIs using the error between the revaluated value of the first POI and the known value of the first POI, turning back to revaluate the first POI using the values of surrounding POIs of the first POI, until the error meets a preset requirement.

* * * * *